(12) United States Patent
Masuda

(10) Patent No.: US 11,001,166 B2
(45) Date of Patent: May 11, 2021

(54) ELECTRIC BRAKE APPARATUS AND ELECTRIC BRAKE SYSTEM

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 221 days.

(21) Appl. No.: 16/242,641

(22) Filed: Jan. 8, 2019

(65) Prior Publication Data
US 2019/0135135 A1 May 9, 2019

Related U.S. Application Data

(63) Continuation of application No. PCT/JP2017/025660, filed on Jul. 14, 2017.

(30) Foreign Application Priority Data

Jul. 20, 2016 (JP) .............................. JP2016-142173

(51) Int. Cl.
*B60M 3/06* (2006.01)
*B60T 8/17* (2006.01)
*B60T 13/74* (2006.01)

(52) U.S. Cl.
CPC ................ *B60M 3/06* (2013.01); *B60T 8/17* (2013.01); *B60T 13/74* (2013.01)

(58) Field of Classification Search
CPC .............. B60M 3/06; B60T 8/17; B60T 13/74
See application file for complete search history.

(56) References Cited

U.S. PATENT DOCUMENTS 4,326,154 A * 4/1982 Lewis ...................... B60L 7/22
318/370
6,232,729 B1 * 5/2001 Inoue ..................... B60L 58/10
318/139

(Continued)

FOREIGN PATENT DOCUMENTS

CN 102892650 A 1/2016
CN 105228870 A 1/2016

(Continued)

OTHER PUBLICATIONS

Masuda, Yui; English Translation of WIPO Application WO2015/190380A1 "Electric brake device and electric brake device system", 2015, Google Patents (Year: 2015).*

(Continued)

*Primary Examiner* — Fadey S. Jabr
*Assistant Examiner* — Naeem Taslim Alam

(57) ABSTRACT

Provided is an electric brake device that achieves improved responsiveness, cost reduction and also reduces the copper loss in an electric motor, thus reducing power consumption. The electric brake device includes a brake rotor (8), a friction member (9), a friction member actuator (6), an electric motor (4), a controller (2), a main power supply (3), and an auxiliary power supply (22). The auxiliary supply (22) is charged with regenerative power from the motor (4). The controller (2) includes a backflow power interruption (26) preventing the main supply (3) from being charged with the regenerative power from the motor (4), and an auxiliary power supply controller (24) causing the auxiliary supply (22) to supply running power to the motor (4) when powering the electric (4) is started in a state in which the regenerative power in the auxiliary supply (22) is greater than or equal to a set voltage.

5 Claims, 7 Drawing Sheets

(56) References Cited

U.S. PATENT DOCUMENTS

| | | | |
|---|---|---|---|
| 6,748,310 B2 | 6/2004 | Tamasho et al. | |
| 9,016,808 B2 | 4/2015 | Maki et al. | |
| 9,586,488 B2 | 3/2017 | Nakaoka et al. | |
| 2003/0040828 A1* | 2/2003 | Chernoff | B60G 17/015 700/117 |
| 2003/0125863 A1 | 7/2003 | Tamasho et al. | |
| 2006/0108867 A1 | 5/2006 | Ralea | |
| 2010/0266922 A1* | 10/2010 | Hasegawa | B60L 58/40 429/432 |
| 2013/0020858 A1 | 1/2013 | Maki et al. | |
| 2016/0089992 A1* | 3/2016 | Le | H02J 7/00047 320/107 |
| 2016/0096434 A1 | 4/2016 | Nakaoka et al. | |
| 2016/0375790 A1* | 12/2016 | Komiyama | G01R 31/389 320/136 |

FOREIGN PATENT DOCUMENTS

| | | | |
|---|---|---|---|
| JP | 2003-194119 | 7/2003 | |
| JP | 2003-247576 | 9/2003 | |
| JP | 2004-322987 | 11/2004 | |
| JP | 2006-250164 | 9/2006 | |
| JP | 2010-270788 | 12/2010 | |
| JP | 4711704 B2 | 6/2011 | |
| JP | 2016-583 | 1/2016 | |
| WO | WO 2015/190380 A | 12/2015 | |
| WO | WO-2015190380 A1 * | 12/2015 | B60L 7/20 |

OTHER PUBLICATIONS

International Search Report dated Oct. 17, 2017 in corresponding International Application No. PCT/JP2017/025660.
Notice of Reasons for Refusal dated Apr. 14, 2020, in corresponding Japanese Patent Application No. 2016-142173 (6 pages).
International Preliminary Report on Patentability dated Jan. 31, 2019 in corresponding International Patent Application No. PCT/JP2017/025660 (7 pages).
Extended and Supplementary European Search Report dated Feb. 6, 2020 in European Patent Application No. 17830946.4 (9 pages).
Chinese Office Action dated Jul. 16, 2020, in corresponding Chinese Patent Application No. 201780044310.5.

* cited by examiner

ELECTRIC BRAKE APPARATUS AND ELECTRIC BRAKE SYSTEM

CROSS REFERENCE TO THE RELATED APPLICATION

This application is a continuation application, under 35 U.S.C. § 111(a), of international application No. PCT/JP2017/025660, filed Jul. 14, 2017, which claims Convention priority to Japanese patent application No. 2016-142173, filed Jul. 20, 2016, the entire disclosure of which is herein incorporated by reference as a part of this application.

BACKGROUND OF THE INVENTION

*Field of the Invention*

The present invention relates to an electric brake device and an electric brake system, and relates to a technique for improving the function of the electric brake device.

*Description of Related Art*

Regarding electric brake devices, the following techniques have been proposed.

A technique for reducing the rotational driving force of an electric motor by a speed reducer, and converting the rotational driving force into linear motion through a linear motion mechanism so as to bring a friction pad into pressure contact with a disc rotor, thereby applying braking force (Patent Documents 1 and 2).

RELATED DOCUMENT

*Patent Document*

[Patent Document 1] JP Laid-open Patent Publication No. 2003-247576
[Patent Document 2] JP Laid-open Patent Publication No. 2010-270788

SUMMARY OF THE INVENTION

To improve the responsiveness of an electric brake device that uses an electric actuator, such as those described in Patent Documents 1 and 2, for example, significant instantaneous power is required. This may increase the costs, weights, and mounting spaces of the power supply device and the wiring. For example, in the electric brake device driven with a low-voltage battery of an automobile or the like, the aforementioned instantaneous power may cause a large current, resulting in increased power consumption and generation of heat due to copper loss in the electric motor.

During operation of the electric brake device, in order to achieve the desired braking force, the speed of the electric motor is increased to change the braking force, and then is reduced to maintain the braking force. At this time, especially, in the case of performing a fast braking operation, the electric motor needs to be regeneratively driven when reducing the speed of the electric motor. However, for example, when the driving power supply of the electric motor is a battery that is close to being fully charged and has a reduced regenerative capacity, or a DC/DC power supply with a small regenerative capacity, significant regenerative power cannot be absorbed, so that a fast operation (response) may not be performed.

It is an object of the present invention to provide an electric brake device and an electric brake system that can achieve improved responsiveness, cost reduction, and the like, and can also reduce the copper loss in an electric motor, thus reducing power consumption.

Hereinafter, in order to facilitate understanding for the sake of convenience, the present invention will be described with reference to the reference numerals in embodiments.

An electric brake device according to an aspect of the present invention is an electric brake device including:
  a brake rotor 8 configured to synchronously rotate with an object to be braked;
  a friction member 9 configured to come into contact with the brake rotor 8;
  a friction member actuator 6 configured to bring the friction member 9 into contact with the brake rotor 8;
  an electric motor 4 configured to drive the friction member actuator 6;
  a controller 2 configured to control braking force by controlling the electric motor 4;
  a main power supply 3 configured to supply power to the electric motor 4; and
  an auxiliary power supply 22 separate from the main power supply 3, wherein
  the auxiliary power supply 22 is configured to be charged with regenerative power from the electric motor 4, and
  the controller 2 includes
    a backflow power interruption device 26 configured to prevent the main power supply 3 from being charged with the regenerative power from the electric motor 4, and
    an auxiliary power supply controller 24 configured to cause the auxiliary power supply 22 to supply running power to the electric motor 4 when powering the electric motor 4 is started in a state in which the regenerative power in the auxiliary power supply 22 is greater than or equal to a set voltage.

The set voltage is any voltage that is predetermined according to design or the like. The set voltage can be determined, for example, by obtaining an appropriate voltage through experimentation and/or simulation.

With this configuration, the auxiliary power supply 22 is charged with regenerative power from the electric motor 4. The backflow power interruption device 26 prevents the main power supply 3 from being charged with the regenerative power from the electric motor 4. The auxiliary power supply controller 24 causes the auxiliary power supply 22 to supply running power to the electric motor 4 when powering the electric motor 4 is started in a state in which the regenerative power in the auxiliary power supply 22 is greater than or equal to a set voltage. Employing the regenerative power in the auxiliary power supply 22 as the subsequent running power enables the electric brake device in which regeneration and powering are alternately performed to achieve fast response.

For example, when a plurality of electric brake devices are mounted on a vehicle or the like and connected to the main power supply 3, power can be supplied from the auxiliary power supply 22 to the electric motor 4. Furthermore, discharge from the auxiliary power supply 22 as a result of its power being consumed for initial powering makes the auxiliary power supply 22 sufficiently rechargeable. In this way, the regenerative power is sufficiently stored such that the regenerative power can be utilized for the subsequent running power for the electric motor 4, without being discarded, so that the load of the main power supply 3 can be reduced.

The auxiliary power supply 22 stores regenerative power therein as described above. For example, when the auxiliary power supply 22 is a power supply device capable of applying a voltage higher than the voltage that can be applied by the main power supply 3, the voltage at the auxiliary power supply 22 is enhanced by the regenerative power from the electric motor 4. Powering the electric motor 4 with the high voltage at the auxiliary power supply 22 achieves a smaller current for the same power. For example, the peak current can be reduced even when large power is needed instantaneously such as for rapid braking. In this way, the copper loss in the electric motor 4 as well as the load of the main power supply 3 is reduced.

The increased voltage and the decreased current reduce the power consumption and also make the motor wire or the like thinner, as compared with a case where the electric brake is driven only by a low-voltage battery. Such thinner motor wire reduces the cost.

The controller 2 may include an auxiliary power supply interruption device 23 configured to prevent the running power from being supplied to the electric motor 4 from the auxiliary power supply 22. The auxiliary power supply interruption device 23 allows switching between causing the auxiliary power supply 22 to supply running power to the electric motor 4 and interrupting this supply, according to the situation.

The auxiliary power supply controller 24 may include:

a voltage monitor 28 configured to monitor a voltage of the auxiliary power supply 22; and an auxiliary power supply voltage booster 29 configured to, when the voltage of the auxiliary power supply 22 monitored by the voltage monitor 28 is less than a set voltage, power-drive the electric motor 4 with the power in the main power supply 3, regardless of a supplied braking force command value, and cause the auxiliary power supply 22 to be charged with regenerative power that is generated by the power-driven electric motor 4 being stopped, so that the voltage of the auxiliary power supply 22 is boosted to the set voltage.

With this configuration, the voltage monitor 28 monitors the voltage of the auxiliary power supply 22. When the monitored voltage of the auxiliary power supply 22 is less than a set voltage, the auxiliary power supply voltage booster 29 power-drives the electric motor 4 with the power in the main power supply 3, regardless of a supplied braking force command value. That is, the voltage monitor 28 causes the auxiliary power supply interruption device 23 to prevent the running power from being supplied from the auxiliary power supply 22, and causes the main power supply 3 to supply power to the electric motor 4. Furthermore, the auxiliary power supply voltage booster 29 causes the auxiliary power supply 22 to be charged with regenerative power that is generated by the power-driven electric motor 4 being stopped, so that the voltage of the auxiliary power supply 22 is boosted to the set voltage. In this way, the regenerative power can be efficiently used for the subsequent running power. An electric brake system according to an aspect of the present invention is an electric brake system including a plurality of the electric brake devices each including the voltage monitor and the like, wherein the controllers 2 of the plurality of electric brake devices are constituted by one controller 2, and the one controller 2 controls at least two predetermined electric brake devices of the plurality of electric brake devices in such a way as to prevent a sum of braking forces of the at least two predetermined electric brake devices from changing due to boosting of the voltage of the auxiliary power supply 22.

Mounting the electric brake system on a vehicle enables the voltage to boost without changes of the braking force of the vehicle, for example. In particular, in a four-wheel vehicle, it is further preferable to perform control such that the pressing force and the decreasing of the pressing force in the respective lateral or diagonal electric brake devices are synchronized, resulting in suppression of the fluctuations in the yaw moment of the vehicle.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
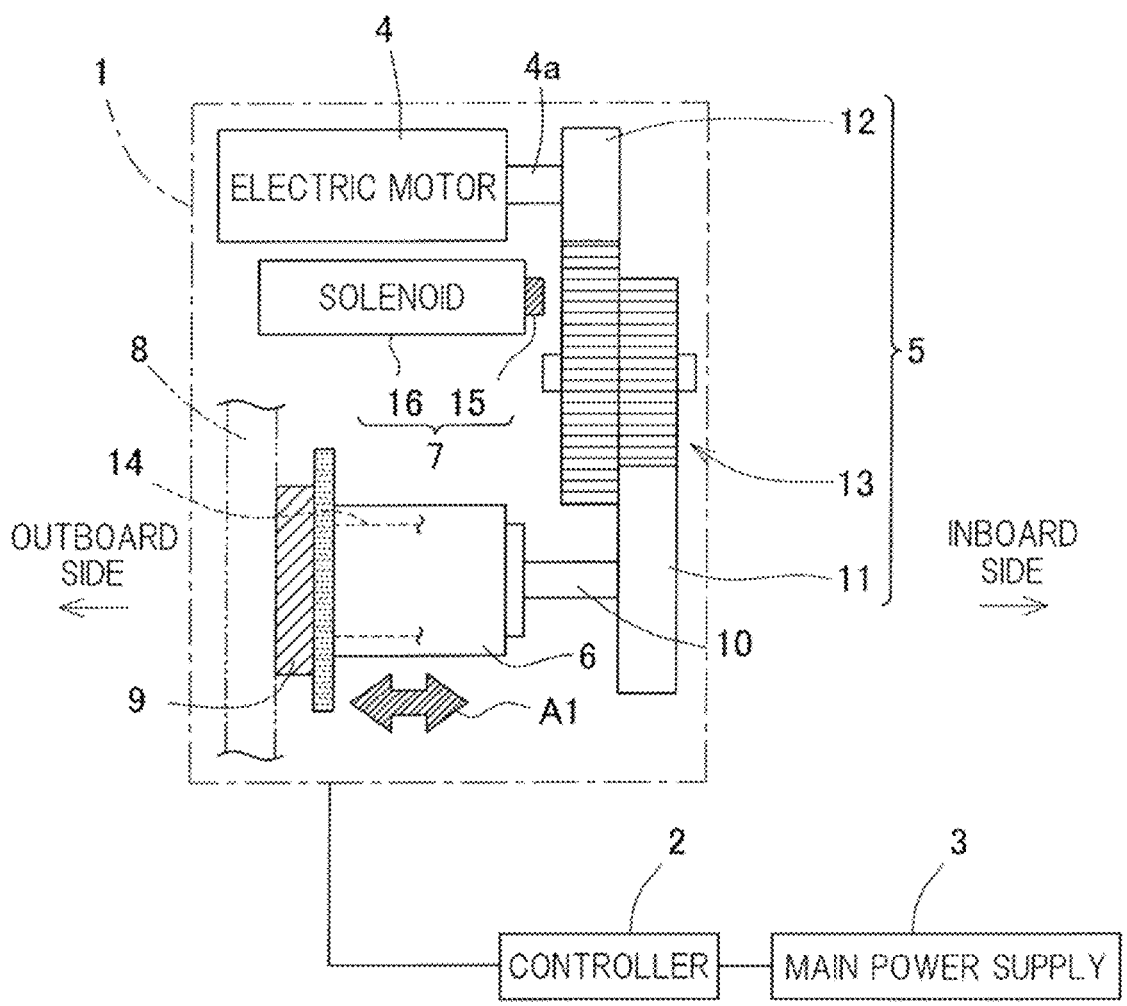
FIG. 1 is a diagram schematically showing an electric brake device according to a first embodiment of the present invention.

An electric brake device according to a first embodiment will be described with reference to FIGS. 1 to 4. A plurality of the electric brake devices are mounted on a vehicle, for example. As shown in FIG. 1, each electric brake device includes an electric actuator 1, a controller 2, and a main power supply 3. First, the electric actuator 1 will be described.

Each electric actuator 1 includes an electric motor 4, a speed reduction mechanism 5, a friction member actuator 6, a parking brake mechanism 7, a brake rotor 8, and a friction member 9. The electric motor 4, the speed reduction mechanism 5, and the friction member actuator 6 are incorporated in, for example, a housing (not shown) or the like. The electric motor 4 is composed of a three-phase synchronous motor or the like.

The speed reduction mechanism 5 is a mechanism that reduces the speed of rotation of the electric motor 4, and includes a primary gear 12, an intermediate gear 13, and a tertiary gear 11. In this example, the speed reduction mechanism 5 reduces, by the intermediate gear 13, the speed of rotation of the primary gear 12 attached to a rotor shaft 4a of the electric motor 4, and transmit the rotation to the tertiary gear 11 fixed to an end portion of the rotation shaft 10. The gears 11, 12, and 13 are rotatable in both directions.

The friction member actuator 6 may be a linear motion mechanism. The linear motion mechanism is a mechanism that converts the rotary motion that is outputted from the speed reduction mechanism 5 into linear motion of a linear motion portion 14 by using a feed screw mechanism, and brings the friction member 9 into contact with the brake rotor 8 or separates the friction member 9 from the brake rotor 8. The linear motion portion 14 is supported so as to be prevented from rotating and be movable in an axial direction indicated by an arrow A1. The friction member 9 is provided at an outboard-side end of the linear motion portion 14. When rotation of the electric motor 4 being transmitted to the friction member actuator 6 through the speed reduction mechanism 5, rotary motion is converted into linear motion, which is then converted into pressing force of the friction member 9, thereby generating braking force. Here, an outer side in the width direction of a vehicle when the electric brake device is mounted on the vehicle is referred to as an "outboard side", and the center side thereof in the vehicle width direction is referred to as an "inboard side".

A parking brake actuator 16 of the parking brake device 7 may be a linear solenoid. A locking member 15 is moved forward by the parking brake actuator 16 to be fitted into a locking hole (not shown) formed in the intermediate gear 13 so as to be engaged with the locking hole, thereby preventing the intermediate gear 13 from rotating. Thus, a parking lock state is achieved. The locking member 15 is removed from the locking hole, thereby allowing rotation of the intermediate gear 13. Thus, an unlock state is achieved.

The controller 2 and the main power supply 3 are connected to the electric actuator 1.

Figure 2:
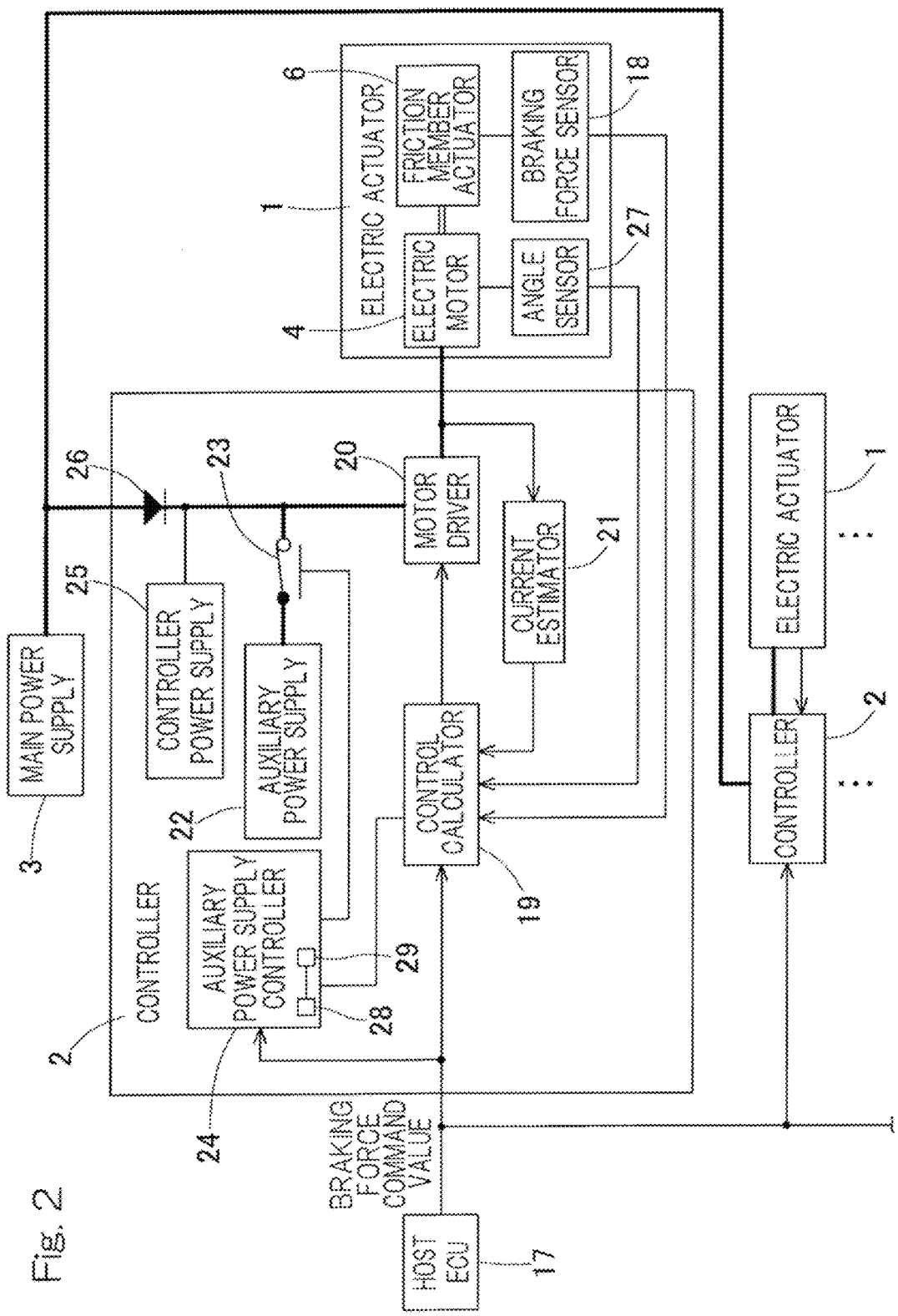
FIG. 2 is a block diagram of a control system of the electric brake device in FIG. 1.

FIG. 2 is a block diagram of a control system of the electric brake device. For example, the controller 2 and the electric actuator 1 are provided for each of the electric brake devices associated with the respective wheels. All of the controllers 2 are connected to the main power supply 3 and the host ECU 17 that serves as a host control means of the controllers 2. For example, the host ECU 17 may be an electric control unit that performs overall control of the vehicle. The host ECU 17 has the function of performing integrated control of the respective controllers 2. The host ECU is also referred to as "VCU".

The main power supply 3 supplies power to the electric motor 4 and the controller 2. The main power supply 3 may include, for example, a battery having a relatively high capacity, a capacitor, and a power supply circuit such as DC/DC or AC/DC.

The host ECU 17 outputs a braking force command value to the controllers 2 in accordance with an output of a braking force sensor 18, which corresponds to the operation amount of a brake pedal (not shown).

Each controller 2 includes a control calculator 19, a motor driver 20, a current estimator 21, an auxiliary power supply 22, an auxiliary power supply interruption device 23, an auxiliary power supply controller 24, a controller power supply 25, and a backflow power interruption device 26.

The control calculator 19 is, for example, a processor such as a microcomputer, or a hardware module such as an ASIC. The control calculator 19 calculates the operation amount of the electric motor 4 on the basis of a braking force command value from the host ECU 17 and various feedback values so as to perform follow-up control of the braking force for the braking force command value, and outputs an operation signal to the motor driver 20. The control calculator 19 may include, for example, a plurality of control systems such as a braking force control system, a motor position control system, and a motor current control system.

Examples of the various feedback values include a motor current value estimated by the current estimator 21, and a motor angle estimated or detected by the angle sensor 27. As the current estimator 21, it is preferable to provide an inexpensive sensor element in terms of reliability and performance. The current estimator 21 may be, for example, a magnetic sensor that detects the magnetic field of a transmission line, or an amplifier that detects the voltage between both ends of a shunt resistor or a field effect transistor (FET). Alternatively, the current estimator 21 may estimate a motor current value on the basis of the applied voltage and the electrical characteristics such as resistance or inductance, of the electric motor 4.

The motor driver 20 forms a half-bridge circuit or the like by using, for example, switch elements such as field effect transistors, and converts DC power into three-phase AC power. Although it is inexpensive and preferable that the motor driver 20 performs PWM control to adjust the ratio of the pulse width at which a power supply voltage is applied to a motor coil terminal, for example, a booster circuit may be additionally provided and PAM control or the like may be performed.

The power from the main power supply 3 is supplied to the controller power supply 25, the auxiliary power supply 22, and the motor driver 20 through the backflow power interruption device 26. The controller power supply 25 supplies power to a light current system or a control and signal circuit system, including the control calculator 19, the auxiliary power supply controller 24, and the motor driver 20. The backflow power interruption device 26 is provided for preventing the main power supply 3 from being charged with regenerative power from the electric motor 4, and charging the auxiliary power supply 22 with the regenerative power. The backflow power interruption device 26 can be configured at a low cost, for example, by using a diode or the like. Alternatively, the backflow power interruption device 26 may include a relay or the like composed of a switch element to perform control so as to prevent power backflow. The power interruption device 26 with the switch element may be formed from a highly efficient switch circuit with little loss.

The auxiliary power supply 22 is capable of being charged with the regenerative power from the electric motor 4. It is preferable, for example, to use a capacitor as the auxiliary power supply 22 because of excellent durability and output. Alternatively, it is possible to employ a battery or the like having a relatively small capacity as compared with a battery commonly used for a vehicle.

The auxiliary power supply controller 24 causes the auxiliary power supply 22 to supply running power to the electric motor 4 when powering the electric motor 4 is started in a state in which the regenerative power stored in the auxiliary power supply 22 is greater than or equal to a set voltage.

The auxiliary power supply controller 24 controls, by using the auxiliary power supply interruption device 23, the connected/interrupted state between the auxiliary power supply 22, and the motor driver 20 and/or the electric motor 4. It may be inexpensive and preferable to use, as the auxiliary power supply interruption device 23, a switch mechanism such as a relay that uses a switch element such as a field effect transistor.

The auxiliary power supply controller 24 determines, for example, based on a braking force command value or the like from the host ECU 17, whether a fast braking operation with high urgency needs to be executed. If the auxiliary power supply controller 24 determines that the fast braking operation does not need to be executed, the auxiliary power supply controller 24 may cause the auxiliary power supply interruption device 23 to connect the auxiliary power supply 22 and the motor driver 20 and to boost the voltage of the auxiliary power supply 22 only when storing the regenerative power generated by the electric motor 4.

When the auxiliary power supply controller 24 determines that the fast braking operation needs to be executed, the auxiliary power supply controller 24 may cause the auxiliary power supply 22 whose voltage has been boosted to supply power to the electric motor 4 so as to achieve a maximum instantaneous output of the electric motor 4.

Thus, mounting the switch mechanism (auxiliary power supply interruption device) 23 and the auxiliary power supply controller 24 allows control to be performed according to the situation, and is therefore preferable. Note, however, that the auxiliary power supply 22 may be constantly connected to the motor driver 20 without mounting the switch mechanism 23 and the auxiliary power supply controller 24. In that case, whether or not to boost the voltage of the auxiliary power supply 22 depends on the braking operation immediately before.

The angle sensor 27 provided to the electric motor 4 of the electric actuator 1 may be a resolver, an encoder, or the like, for example. A sensor-less estimation means that estimates the current angle on the basis of the voltage or the like of an electric motor coil may be provided in place of the angle sensor 27. The braking force sensor 18 that estimates the braking force may be, for example, an axial load sensor that detects the amount of deformation or the like caused by the axial load of the friction member actuator 6, or it is possible to provide a sensor-less estimation means that estimates the current axial load on the basis of the load torque to the electric motor 4 detected on the basis of the motor current, or the motor angle and the rigidity of the electric brake device.

A redundant system and other sensor systems such as a thermistor that are required for the electric brake device, and a separate charging means or the like for the main power supply 3, such as a high-voltage battery and an alternator in an automobile, may be provided as needed.

Figure 3A:
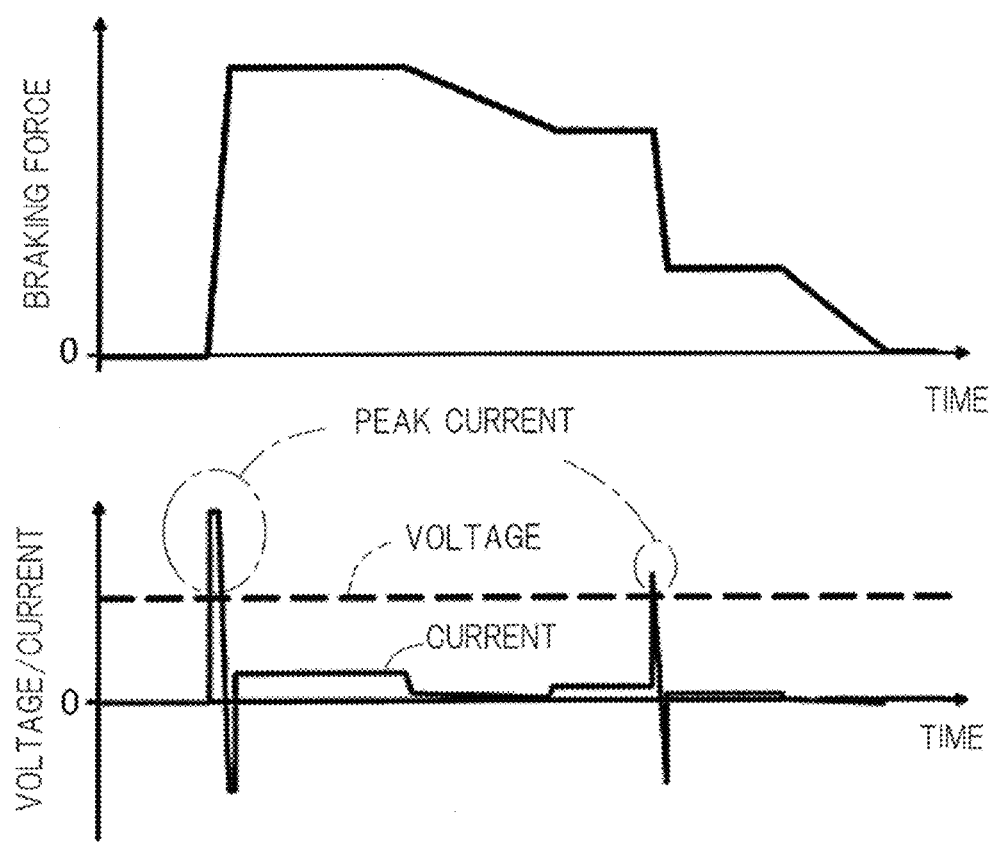
FIG. 3A is a diagram showing an example in which an operation is performed using a single power supply by an electric brake device of a conventional example.
Figure 3B:
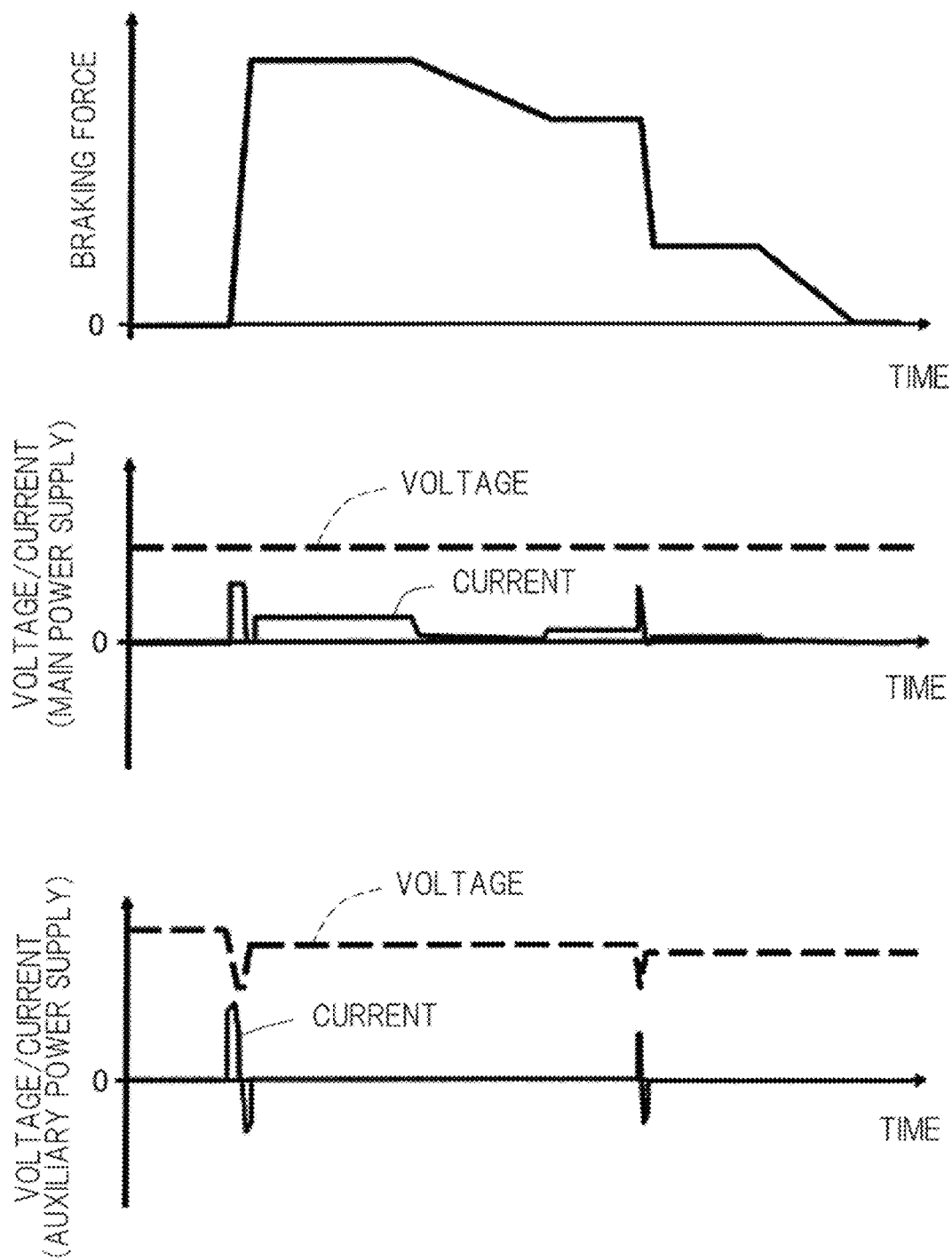
FIG. 3B is a diagram showing an operation example of the electric brake device in FIG. 1.

FIG. 3A is a diagram showing an example in which an operation is performed using a single power supply by an electric brake device of a conventional example. FIG. 3B is a diagram showing an operation example of the electric brake device according to this embodiment. In each of the drawings, the graph at the top shows the transition of the braking force, and the graphs located therebelow show the voltage (indicated by the dashed line) and the current (indicated by the solid line) of the power supply device when the braking force is achieved. In the conventional example shown in FIG. 3A, a peak current is generated when the braking force changes rapidly.

In contrast, with the electric brake device according to this embodiment, the peak current of the main power supply 3 is decreased by the output of the auxiliary power supply 22 as shown in FIGS. 2 and 3B. The load of the main power supply 3 can be reduced even when a plurality of the electric brake devices are connected. Additionally, the voltage of the auxiliary power supply 22 is boosted when a current in the negative direction, that is, a regenerative current, is generated in the auxiliary power supply 22, so that the current value for the next rapid braking force is reduced.

Figure 4:
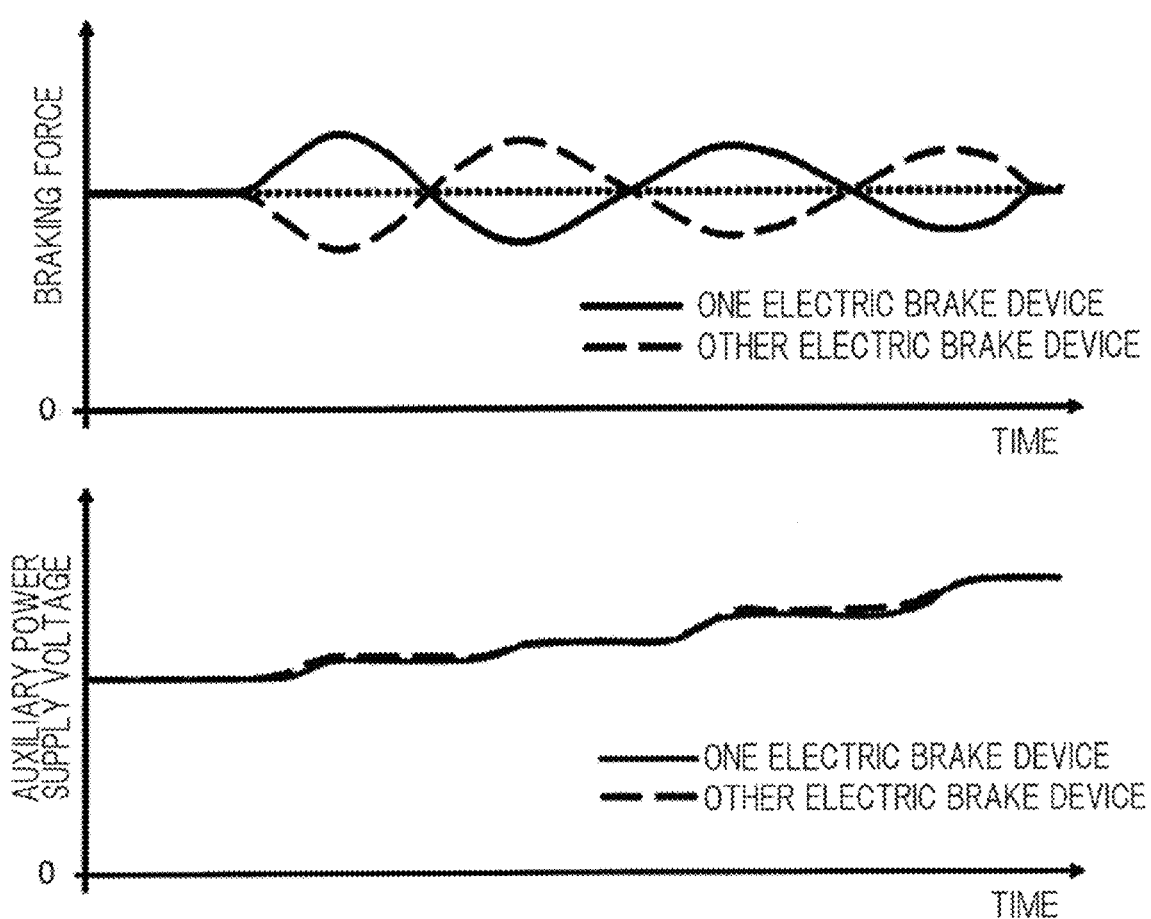
FIG. 4 is a diagram showing an example in which the voltage of an auxiliary power supply of the electric brake device in FIG. 1 is boosted.

FIG. 4 is a diagram showing an example in which the voltages of the auxiliary power supplies of a plurality of electric brake devices are boosted in an electric brake system including the electric brake devices. In this example, as shown in FIGS. 2 and 4, the voltages of the auxiliary power supplies 22 are boosted by driving the electric brake devices. This driving is caused independently of the braking force command value from the host ECU 17. Each auxiliary power supply controller 24 in this example includes a voltage monitor 28 and an auxiliary power supply voltage booster 29.

The voltage monitor 28 monitors the voltage of the auxiliary power supply 22. When the voltage of the auxiliary power supply 22 monitored by the voltage monitor 28 is less than a set voltage, the auxiliary power supply voltage booster 29 power-drives the electric motor 4 with the power of the main power supply 3, whatever the supplied braking force command value is. Also when the voltage of the auxiliary power supply 22 monitored by the voltage monitor 28 is less than a set voltage, the auxiliary power supply voltage booster 29 causes the auxiliary power supply 22 to be charged with regenerative power that is generated by the power-driven electric motor 4 being stopped, so that the voltage of the auxiliary power supply 22 is boosted to the set voltage.

As described above, in the operation according to this embodiment, when the monitored voltage of the auxiliary power supply 22 is less than the set voltage, the auxiliary power supply voltage booster 29 chooses the main power supply 3 as one that power-drives the electric motor 4, and causes the auxiliary power supply 22 to store therein the generated regenerative power when reducing the speed of the electric motor 4. In this way, the regenerative power can be efficiently used for the subsequent running power. As described above, the voltage of the auxiliary power supply 22 can be boosted by storing the regenerative power in the auxiliary power supply 22, thereby attaining any desired voltage.

As shown in the upper graph in FIG. 4, in the electric brake system, a part of the plurality of electric brake devices cancels out the changes of the braking force of the rest of the electric brake devices, thereby making the sum of the braking forces uniform. Note that in the example shown in the drawing, the electric brake system includes two electric brake devices, and one of the electric brake devices cancels out the changes of the braking force of the other brake device. Making the sum of the braking forces uniform means that the sum of the braking forces of the plurality of electric brake devices does not change before and after performing control to execute this operation. By executing this operation, it is possible to perform, for example, a voltage boosting operation for the auxiliary power supply 22 (FIG. 2) as shown in the lower graph in FIG. 4, without causing changes in the braking force of the vehicle.

At this time, especially in a four-wheel vehicle, for example, it is further preferable to perform the control shown in the upper graph in FIG. 4 such that increasing of the pressing force and the decreasing of the pressing force in respective lateral or diagonal electric brake devices are synchronized, because the fluctuations in the yaw moment of the vehicle can be suppressed. Each controller 2 or the host ECU 17 shown in FIG. 2 performs the control to cancel out the changes of the braking force and making the sum of the braking forces uniform.

Here, for example, in a system including a single electric brake device or a system that allows changes of the braking force, the voltage can be boosted in the auxiliary power supply 22 by varying the braking force, without canceling out the changes of the braking force or making the sum of the braking forces uniform.

With the electric brake device described above, the auxiliary power supply 22 stores therein regenerative power from the electric motor 4. The backflow power interruption device 26 prevents the regenerative power from the electric motor 4 from charging the main power supply 3. The auxiliary power supply controller 24 causes the auxiliary power supply 22 to supply running power to the electric motor 4 when powering of the electric motor 4 is started in a state in which the regenerative power stored in the auxiliary power supply 22 is greater than or equal to a set voltage. Employing the regenerative power in the auxiliary power supply 22 as the subsequent running power enables the electric brake device in which regeneration and powering are alternately performed to achieve fast response.

For example, when a plurality of electric brake devices are mounted on a vehicle or the like and connected to the main power supply 3, power can be supplied from the auxiliary power supply 22 to the electric motor 4. Furthermore, discharge from the auxiliary power supply 22 as a result of its power being consumed for initial powering makes the auxiliary power supply 22 sufficiently rechargeable. In this way, the regenerative power is sufficiently stored such that the regenerative power can be utilized for the subsequent running power for the electric motor 4, without being discarded, so that the load of the main power supply 3 can be reduced.

The auxiliary power supply 22 stores regenerative power therein as described above. For example, when the auxiliary power supply 22 is a power supply device capable of applying a voltage higher than the voltage that can be applied by the main power supply 3, the voltage at the auxiliary power supply 22 is enhanced by the regenerative power from the electric motor 4. Powering the electric motor 4 with the high voltage at the auxiliary power supply 22 achieves a smaller current for the same power. For example, the peak current can be reduced even when large power is needed instantaneously such as for rapid braking. In this way, the copper loss in the electric motor 4 as well as the load of the main power supply 3 is reduced.

The increased voltage and the decreased current reduce the power consumption and also make the motor wire or the like thinner, as compared with a case where the electric brake is driven only by a low-voltage battery. Such thinner motor wire reduces the cost.

Figure 5:
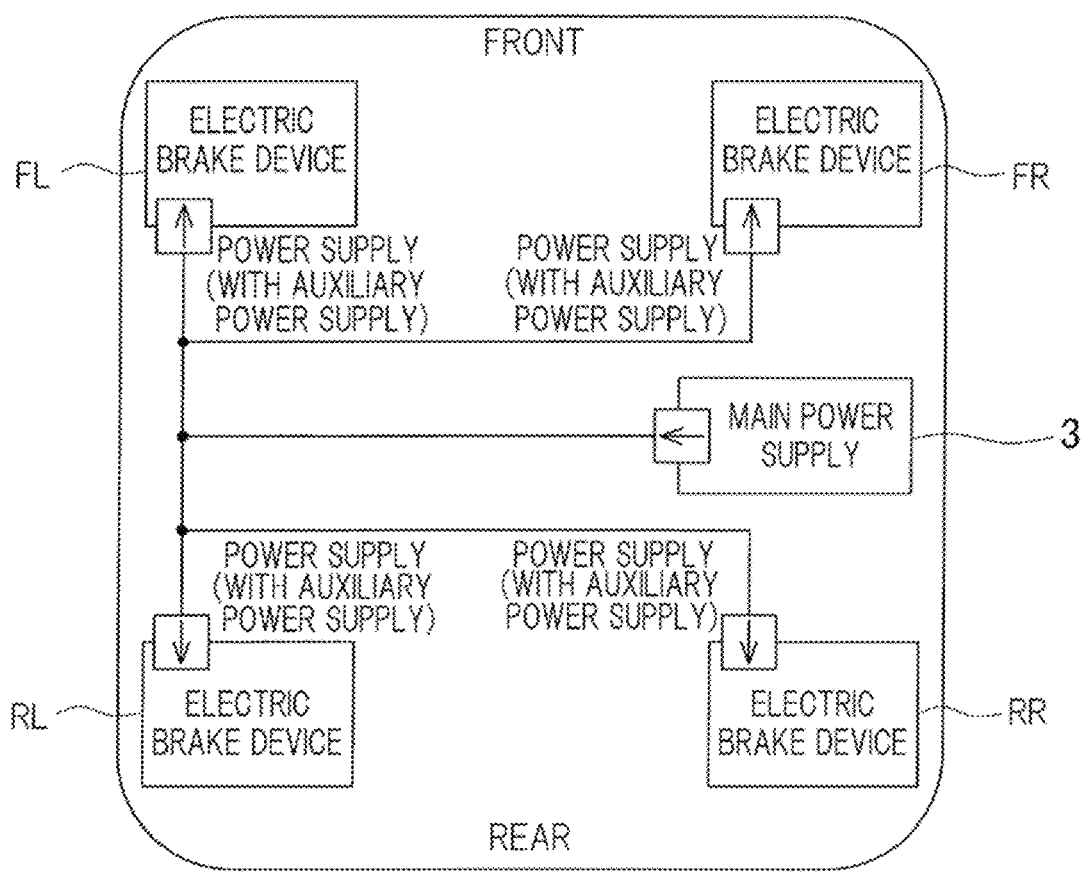
FIG. 5 is a block diagram schematically showing a configuration example of an electric brake system according to the first embodiment of the present invention.

FIG. 5 is a block diagram schematically showing a configuration example of an electric brake system according to the first embodiment. In this example, all of the front, rear, left, and right wheels of a four-wheel vehicle are provided with the electric brake devices according to the first embodiment. In the electric brake system, four electric brake devices FL, FR, RL, and RR are controlled such that the change, due to boosting the voltage of the auxiliary power supply 22 (FIG. 2), of the sum of the braking forces of the four electric brake devices FL, FR, RL, and RR is avoided.

In this case, it is possible to stabilize the attitude of the vehicle while suppressing the fluctuations in the yaw moment of the vehicle, by performing an operation in which increasing of the pressing force and the decreasing of the pressing force in the respective lateral or diagonal electric brake devices are synchronized.

Figure 6:
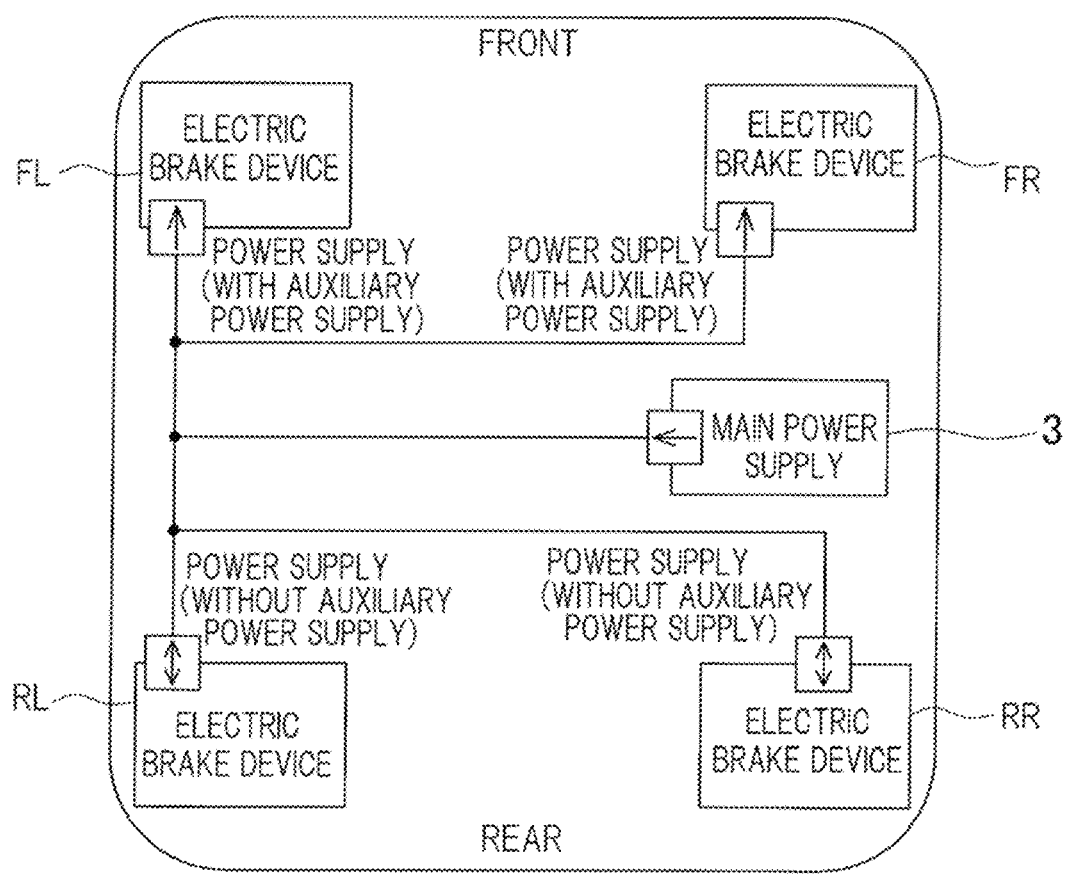
FIG. 6 is a block diagram schematically showing a configuration example of an electric brake system according to a second embodiment of the present invention.

FIG. 6 is a block diagram schematically showing a configuration example of an electric brake system according to a second embodiment. In this configuration example, the left and right front wheels are provided with the electric brake devices FL and FR according to the first embodiment. The left and right rear wheels are provided with electric brake devices RL and RR, shown in FIG. 2, including a controller corresponding to the controller 2 from which the auxiliary power supply, the auxiliary power supply controller, the backflow power interruption device, and the like have been omitted. In this configuration example, the regenerative power of the electric brake devices RL and RR of the respective left-rear wheel and the right-rear wheel is stored in the auxiliary power supplies 22 (FIG. 2) of the electric brake devices FL and FR of the respective left-front wheel and the right-front wheel.

In general, a load acts on the front portion of a four-wheel vehicle in braking, and, therefore, the braking force applied to the front wheels are larger than the braking force to the rear wheels. According to the configuration example shown in FIG. 6, in a fast electric braking operation, the regenerative power of the electric brake devices FL, FR, RL, and RR during regeneration of the electric motors is concentratedly stored in the auxiliary power supplies 22 (FIG. 2) of the electric brake devices FL and FR of the left-front wheel and the right-front wheel that require a larger electric motor output. In this way, the responsiveness of the electric brake devices FL and FR of the front wheels is further improved.

Alternatively, a voltage monitor that monitors the voltage of the auxiliary power supply may be provided in the host ECU. The host ECU may transmit the information being monitored to the auxiliary power supply voltage booster of the auxiliary power supply controller.

One controller and one auxiliary power supply may be provided for two electric actuators respectively corresponding to the left and right front wheels, and one controller and one auxiliary power supply may be provided for two electric actuators respectively corresponding to the left and right rear wheels.

The auxiliary power supply controller may determine that a fast braking operation needs to be executed when an anti-lock brake (ABS) signal is inputted, and may cause the auxiliary power supply whose voltage has been boosted to supply power to the electric motor, thereby achieving a maximum instantaneous output of the electric motor.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . controller
3 . . . main power supply

4 . . . electric motor
6 . . . friction member actuator
8 . . . brake rotor
9 . . . friction member
22 . . . auxiliary power supply
24 . . . auxiliary power supply controller
26 . . . backflow power interruption device
FL, FR, RL, RR . . . electric brake device

What is claimed is:

1. An electric brake device comprising:
a brake rotor configured to synchronously rotate with an object to be braked;
a friction member configured to come into contact with the brake rotor;
a friction member actuator configured to bring the friction member into contact with the brake rotor;
an electric motor configured to drive the friction member actuator;
a controller configured to control braking force by controlling the electric motor;
a main power supply configured to supply power to the electric motor; and
an auxiliary power supply separate from the main power supply, wherein
the auxiliary power supply is configured to be charged with regenerative power from the electric motor, and
the controller is configured to
prevent the main power supply from being charged with the regenerative power from the electric motor, and
cause the auxiliary power supply to supply running power to the electric motor when powering the electric motor is started in a state in which a voltage of the regenerative power in the auxiliary power supply is greater than or equal to a set voltage.

2. The electric brake device as claimed in claim 1, wherein the controller is further configured to prevent the running power from being supplied to the electric motor from the auxiliary power supply.

3. The electric brake device as claimed in claim 2, wherein the controller is further configured to
monitor a voltage of the auxiliary power supply; and
when the monitored voltage of the auxiliary power supply is less than a set voltage,
power-drive the electric motor with the power from the main power supply, regardless of a supplied braking force command value, and
cause the auxiliary power supply to be charged with regenerative power that is generated by the power-driven electric motor being stopped, so that the voltage of the auxiliary power supply is boosted to the set voltage.

4. An electric brake system, comprising:
a first brake device, including:
a first brake rotor configured to synchronously rotate with a first object to be braked,
a first friction member configured to come into contact with the first brake rotor,
a first friction member actuator configured to bring the first friction member into contact with the first brake rotor,
a first electric motor configured to drive the first friction member actuator, and
a first auxiliary power supply configured to be charged with regenerative power from the first electric motor;
a second brake device, including:
a second brake rotor configured to synchronously rotate with a second object to be braked,
a second friction member configured to come into contact with the second brake rotor,
a second friction member actuator configured to bring the second friction member into contact with the second brake rotor, and
a second electric motor configured to drive the second friction member actuator;
a main power supply, separate from the first auxiliary power supply, configured to supply power to the first electric motor and the second electric motor; and
a controller configured to:
control a braking force by controlling the first electric motor and the second electric motor,
prevent the main power supply from being charged with the regenerative power from the first electric motor and the second electric motor, and
cause the first auxiliary power supply to supply running power to the first electric motor when powering the first electric motor is started in a state in which a voltage of the regenerative power in the first auxiliary power supply is greater than or equal to a set voltage.

5. The electric brake system of claim 4, wherein
the second brake device further includes a second auxiliary power supply configured to be charged with regenerative power from the second electric motor,
the controller is configured to monitor a voltage of the first auxiliary power supply and a voltage of the second auxiliary power supply, and
the controller is configured to control the first and second electric brake devices to prevent a sum of braking forces of the first and second electric brake devices from changing due to a boosting of the voltage of the first auxiliary power supply or a boosting of the voltage of the second auxiliary power supply.

* * * * *